United States Patent Office 3,202,671
Patented Aug. 24, 1965

3,202,671
2,9 - DIMETHYL - 4 - HYDROXY - 1,2,3,4 - TETRA-HYDRO - 9H - PYRIDO[3,4-b]INDOLE AND ITS ACID ADDITION SALTS
Jacob Szmuszkovicz, Kalamazoo, Mich., assignor to The Upjohn Company, Kalamazoo, Mich., a corporation of Delaware
No Drawing. Filed Nov. 6, 1963, Ser. No. 321,688
2 Claims. (Cl. 260—296)

This invention relates to a novel indole derivative and acid addition salts thereof.

The compounds of this invention include 2,9-dimethyl-4-hydroxy-1,2,3,4-tetrahydro-9H-pyrido[3,4-b]indole of the formula

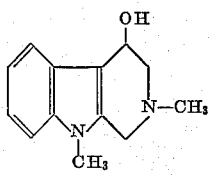

and the physiologically acceptable acid addition salts thereof, such as the hydrochloride, hydrobromide, acetate, pyruvate, sulfate, phosphate, citrate, tartrate, salicylate, lactate, succinate, benzoate, nitrate, p-toluenesulfonate and the like.

The products and intermediate of this invention are named in accord with the basic structure having positions numbered as follows:

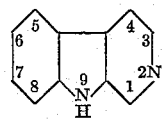

The compounds of this invention demonstrate significant anti-inflammatory activity and can be administered to humans and animals orally as the primary active ingredient of conventional pharmaceutical forms such as tablets, capsules, elixirs and the like and applied topically in ointments, lotions and the like. These compounds also show pronounced anorexigenic and central nervous system stimulant activities, and are effective antiparasitic agents and inhibit tryptophan metabolism. Additionally, the free base forms a salt with fluosilicic acid which is useful as a mothproofing agent in accord with U.S. Patents 1,915,334 and 2,075,359. The free base also forms a salt with thiocyanic acid which condenses with formaldehyde to form resinous materials useful as pickling inhibitors according to U.S. Patents 2,425,320 and 2,606,155.

In preparing the products of this invention, the known 2,9 - dimethyl - 1,3,4-trioxo-1,2,3,4-tetrahydro-9H-pyrido[3,4-b]indole is reduced to 2,9-dimethyl-4-hydroxy-1,2,3,4-tetrahydro-9H-pyrido[3,4-b]indole. Conventional treatment of the free base with the appropriate acid, such as hydrochloric, hydrobromic, acetic and the like produces the corresponding acid addition salt as alluded to above.

The following examples illustrate the synthesis of representative products of this invention but are not to be construed as limiting the scope thereof.

EXAMPLE 1

2,9 - dimethyl - 4 - hydroxy-1,2,3,4-tetrahydro-9H-pyrido [3,4-b]indole

Powdered 2,9-dimethyl-1,3,4-trioxo-1,2,3,4-tetrahydro-9H-pyrido[3,4-b]indole (1 g., 4.14 mmole) was added all at once to a solution of lithium aluminum hydride (2 g.) in 100 ml. of tetrahydrofuran under nitrogen. The resulting mixture was refluxed 6 hours and allowed to stand 48 hours. It was cooled in ice and decomposed in succession with 2 ml. of water, 2 ml. of 15% sodium hydroxide solution and 6 ml. of water. The mixture was then stirred for 1 hour at room temperature, filtered and the cake washed with tetrahydrofuran. The pale yellow filtrate was evaporated to dryness in vacuo to give 0.922 g. of oil. A solution of this oil in benzene was extracted four times with 5% acetic acid (total, 50 ml.). The extracts were washed once with ether and then basified with 15% sodium hydroxide. The resulting crystalline mixture was extracted with methylene chloride. The extracts were washed with saturated salt solution, dried with sodium sulfate and evaporated to give 0.688 g. of oil. Several crystallizations from Skellysolve B (hexane hydrocarbons) and decantation from a small amount of insoluble material afforded 0.26 g. (29% yield) of desired product as clusters, M.P. 126–128° C. Ultraviolet spectrum (ethanol) showed λ max. 224 (34,950); sh 275 (6,150); 281 (6,600); 291 (5,650). Infrared spectrum (mineral oil mull) showed OH: 3325, 3200; tert. amine: 2775; C=C: 1615, 1590.

*Analysis.*—Calcd. for $C_{13}H_{16}N_2O$: C, 72.19; H, 7.46; N, 12.95; N.E., 216. Found: C, 72.23; H, 7.37; N, 13.11; N.E., 227.

EXAMPLE 2

Salts

Acid addition salts of the product of Example 1 are prepared conventionally by treating the indole with the desired acid, such as hydrochloric, hydrobromic, acetic, pyruvic, sulfuric, phosphoric, citric, tartaric, salicyclic, lactic, succinic, benzoic, nitric, p-toluenesulfonic and the like, followed by customary purification.

What is claimed is:

1. A compound selected from the group consisting of (1) 2,9 - dimethyl-4-hydroxy-1,2,3,4-tetrahydro-9H-pyrido[3,4-b]indole of the formula

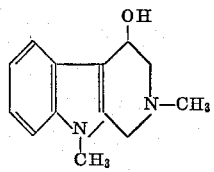

and (2) physiologically acceptable acid addition salts thereof.

2. 2,9 - dimethyl - 4-hydroxy-1,2,3,4-tetrahydro-9H-pyrido[3,4-b]indole.

No references cited.

WALTER A. MODANCE, *Primary Examiner.*